2,893,837

PRODUCTION OF ALUMINA

Kenneth K. Kearby, Watchung, and George R. Gilbert, Elizabeth, N.J., assignors to Esso Research and Engineering Company, a corporation of Delaware No Drawing. Application March 25, 1955
Serial No. 496,908

11 Claims. (Cl. 23—142)

This invention relates to a method of making alumina which can be used as such or may be combined with other materials to form catalysts or contacting agents.

Various methods are known in the prior art for producing alumina or activated alumina which can be used as an adsorbent or catalyst. For example, aluminum alcoholates can be hydrolyzed with water to form alumina. Aluminum metal can be reacted with acetic acid in the presence of a catalyst to produce alumina hydrosol and hydrogel.

According to the present invention alumina can be readily produced. The alumina made according to the present invention has a high surface area and can be used as such as a drying agent, adsorbent or catalyst or can be impregnated with or combined with other metal compounds or refractory metal oxides to produce catalytic materials. The alumina is especially adapted for use as a hydroforming catalyst when combined with a group VI metal oxide such as molybdenum oxide. Or the alumina may be combined with silica in the form of the hydrosol or hydrogel or the like to form a silica-alumina cracking catalyst. The alumina made according to the present invention may be used as a base or support for other catalytic materials for use in polymerization, isomerization, platinum hydroforming, dehydrogenation and other catalytic reactions.

More specifically, solid dry granules or solid dry microspheres of an alkali metal aluminate are contacted and reacted with anhydrous gasiform acidic material or gaseous acid anhydride from below normal temperature to temperatures as high as 1000° F. or higher. The resulting dry solid reaction product is washed with water to remove the alkali metal salt of the acid used and the purified solid alumina may then be dried and calcined for use as a catalyst, a catalyst base or for other uses. The gaseous or vaporous acid combines with the alkaline component. By using substantially anhydrous gaseous acids or acidic materials, initial water dissolution and solidification of the aluminate compound are avoided before the alkaline components are neutralized. Furthermore, the difficulty of filtering gelatinous aluminum hydroxide is avoided by the method of this invention.

The treatment of the solid alkali metal aluminate with the gasiform acidic material may be carried out in various ways. The alkali metal aluminate may be maintained as one or more fixed beds through which the gaseous acid is passed, or the alkali metal aluminate can be in the form of a bed of powder or finely divided solid dry particles and the gaseous acid passed up through the bed of solids at a velocity selected to produce a dense turbulent fluidized bed of solids.

After the reaction is completed and the alkali metal salt of the reacting gaseous acid used is formed, the treated alkali metal aluminate material is washed with water several times to remove the formed alkali metal salt. Alumina prepared by the present invention filters easily and is superior in this respect to gelatinous precipitated hydrous aluminas. This facilitates the washing out of the alkaline salt of the treating acid.

The gaseous acidic materials or gaseous acid anhydrides which may be used in the present invention include $SO_2$; $SO_2$ plus $SO_3$ as formed, for example, in sulfuric acid plants; HCl; acetic acid as a vapor; $H_2S$, as produced, for example, in petroleum refining of mixtures of light hydrocarbon gases; $CO_2$ as formed, for example, in flue gases; $CO_2$ from other sources; halogen gas such as chlorine; and the like. The gaseous or vaporous acid reacts with the alkaline component in the alkali metal aluminate to form a water soluble salt which is later washed out with water to leave a substantially pure alumina which may be dried, and calcined for use as a catalyst, catalyst base or other uses. The calcined alumina has a high surface area. When sodium aluminate and sulfur dioxide are used, the overall chemical reaction is:

$$2NaAlO_2 + SO_2 \rightarrow Na_2SO_3 + Al_2O_3$$

EXAMPLE 1

A catalyst was prepared for use in hydroforming naphthas, the alumina component being prepared as follows. Four stationary beds of granular sodium aluminate in glass reactors were arranged in series. The granules of sodium aluminate had an average size of about 4–8 mesh and about 280 grams were used in each bed. The aluminate has the following chemical analysis:

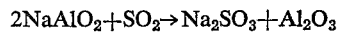

| | |
|---|---|
| $Na_2O$ | percent by weight 29.1 |
| $Al_2O_3$ | 40.6 |
| Ingition loss | 26.1 |

Anhydrous HCl gas was passed up through the beds of the sodium aluminate in series for about 60 minutes. During the passage of the HCl gas through the beds of granular aluminate, heat was produced by the exothermic reaction and after the heat of reaction had subsided, the sodium aluminate granules were removed from the glass reactor, mixed thoroughly and then replaced in the reactor as several beds. The replaced treated sodium aluminate granules were then further treated with additional anhydrous HCl gas until no further evidence of heat evolution was noted.

The treated aluminate granules were then removed from the reactor and washed free of sodium chloride by slurrying in water, settling and decanting the water several times until the filtered wash water was free of chloride ions. Then the alumina granules were dried at about 400° F. and then calcined at about 1200° F. for about 3 hours. About 453 grams of calcined alumina were recovered. A 270 gram portion of dried and calcined alumina granules was then pulverized, mixed with about 28 grams of $MoO_3$ in the dry state and the resulting mixture calcined for 6 hours at 1400° F. and pilled into 3/16" x 3/16" cylindrical pills to an apparent density of about 0.69.

The catalyst contained about 90% by weight $Al_2O_3$ and 10% by weight $MoO_3$. The catalyst in granular form was used in a fixed bed hydroforming unit at a space rate of about 0.5 w./hr./w. (weight of naphtha per hour per weight of catalyst), at a temperature of about 900° F., at a pressure of 200 p.s.i.g. and with about 2000 standard cubic feet of hydrogen per barrel of naphtha feed. The naphtha feed was a virgin naphtha boiling between about 200° and 330° F. The catalyst of this invention was compared to 90% $Al_2O_3$–10% $MoO_3$ prepared by mixing alumina, made by reacting sodium aluminate solution with aluminum sulfate solution, filtering, washing, drying and calcining the precipitate, with dry $MoO_3$ and finishing as described by Example 1.

The results are as follows:

Table 1

| Catalyst | Cycle No. | Research Octane No. | Gasoline, Vol. Percent |
|---|---|---|---|
| This Invention | 1 | 92.5 | 80.5 |
|  | 2 | 95.0 | 82.0 |
| Prior Art | 1 | 89.0 | 84.0 |
|  | 4 | 96.0 | 78.0 |

The gasoline was obtained by allowing the naphtha produced to reach equilibrium vapor pressure at room temperature (70° F.).

From the above data it will be seen that the fresh hydroforming catalyst made with alumina prepared according to this invention gives initially a higher octane number gasoline than catalyst of the prior art. The comparative activities for cycles 2 and 4 indicate that this advantage may not persist after several cycles. It is, however, of greater importance that the yield of the gasoline is higher for the catalyst of this invention.

EXAMPLE 2

In another preparation amounts of the same grade of sodium aluminate, above identified, were reacted with anhydrous chlorine gas in the same manner as shown in Example 1.

The dried and calcined alumina granules had a surface area of about 197 square meters per gram, which is suitable for used as a catalyst, a catalyst support or as an adsorbent.

To further demonstrate its use as a catalyst support, a catalyst was made by impregnating a portion of the alumina, made as shown in Example 2, with an aqueous solution of chlorplatinic acid. The final material after drying and calcination had a platinum content of 0.6 weight percent. This catalyst when used to hydroform a virgin naphtha boiling between about 200° and 330° F. possessed a high degree of activity as shown by the following average results:

Temperature, °F _____ 900
Feed rate, vols. of feed per volume of catalyst per hour _____ 1
Hydrogen feed, standard cubic feet per barrel of feed per hour _____ 5000
Volume percent of naphtha, based on feed _____ 85
Research octane number of naphtha _____ 95

EXAMPLE 3

In another preparation, anhydrous $CO_2$ gas was used instead of HCl gas and the method of preparation was similar to that given above in Example 1. The dried and calcined alumina had a surface area of about 139 square meters per gram.

EXAMPLE 4

In another preparation, anhydrous $H_2S$ gas was used instead of HCl gas and the method of preparation was similar to that given above in Example 1. The dried and calcined alumina had a surface area of 185 square meters per gram.

Instead of using granules of the alkali metal aluminate, the aluminate material may be in the form of a powder having the major proportion of the particles of a size in the range of 20 to 80 microns and the anhydrous acid vapor or gas or anhydrous gas or vapor anhydride may be used as the fluidizing gas at a superficial velocity between about 1 and 5 feet per second so that the powder or finely divided aluminate is maintained as a dense turbulent fluidized bed or mixture having the appearance of a violently boiling liquid.

Instead of using dry solid granules of sodium aluminate, dry solid microspheres of sodium or potassium aluminate made by spray drying water solutions of the aluminate material may be fluidized with acidic gases or with mixtures of acidic gases and inert gases, washed free of the salts and finished as described previously.

EXAMPLE 5

To illustrate the application of this invention using the "fluid" solids technique, approximately 100 grams of spray-dried sodium aluminate were fluidized with a stream of anhydrous $SO_2$ gas, flowing at the rate of about 1.5 feet per second, for about 30 minutes. When the heat of reaction and absorption stopped, a stream of inert gas was introduced to purge the system of the acid gas. The microspheres were then washed with water in the same manner used in Example 1. The alumina recovered after drying at 400° F. for 16 hours and after calcining for 3 hours at 1200° F. was in the form of fluidizable microspheres. About 38 grams of this material, having a surface area of 189 square meters per gram, were recovered. The high surface area and fluidizable form of this alumina makes it useful as an adsorbent and catalyst and as a support for other active catalytic compounds.

As above pointed out the alumina prepared according to this invention may be used for the preparation of variout catalysts. Instead of dry mixing $MoO_3$ with the alumina of the present invention, the alumina either calcined or not, may be impregnated with an aqueous solution of a molybdenum salt or compound such as ammonium molybdate and the resulting mixture calcined to reduce the molybdenum compound to $MoO_3$. Or the alumina may be impregnated with chromium nitrate and the resulting mixture calcined to produce chromium oxide on alumina. Instead of heating, the chromium compound may be reacted with ammonium hydroxide to precipitate chromium oxide.

To make suitable cracking catalysts, the alumina prepared according to this invention may be mulled with silica hydrogel, dried and calcined.

Another method for making cracking catalysts especially suitable for "fluid" cracking is to impregnate the alumina microspheres, prepared as shown in Example 5, with silica hydrosol or with ethyl silicate which may be mixed with dilute HCl to initiate hydrolysis. After the hydrolysis is completed (within the pores of alumina support) the catalyst is dried and calcined to produce hard microspheres resistant to attrition.

What is claimed is:

1. A method of preparing alumina of high surface area which comprises reacting dry solid granules of an alkali metal aluminate compound with anhydrous gasiform acidic material, then water washing the so treated compound to remove water soluble salt formed by the reaction, then drying and calcining the solid residue to produce alumina.

2. A method according to claim 1 wherein said anhydrous gasiform acidic material is selected from the group consisting of gasiform acids, acid anyhydrides and halogens.

3. A method according to claim 1 wherein the solid alkali metal aluminate is in the form of microspheres.

4. A method according to claim 1 wherein said anhydrous gasiform acidic material is selected from the group consisting of HCl, $Cl_2$, $CO_2$, $H_2S$, $SO_2$ and $SO_3$.

5. A method according to claim 1 wherein said alkali metal aluminate compound comprises sodium aluminate.

6. A method of preparing alumina of relatively high surface area which comprises reacting dry solid microspheres of an alkali metal aluminate with anhydrous gasiform acidic material in an exothermic reaction, maintaining said microspheres as a dense turbulent fluidized bed by passing said anhydrous gasiform acidic material upwardly through said fluidized bed at a fluidizing velocity, and continuing the flow of gasiform acidic material until there is no further evidence of heat evolution, then purging said fluidized bed with an inert gas, then washing said treated microspheres with water to remove water soluble products of the reaction, then drying and calcining said treated microspheres to produce alumina microspheres.

7. A method of preparing alumina of relatively high surface area which comprises reacting dry solid granules of an alkali metal aluminate with anhydrous gasiform acidic material in an exothermic reaction, continuing the reaction until there is no further evidence of heat evolution, then water washing the treated granules to remove water soluble compounds formed during the reaction, then drying and calcining the dried residue to produce alumina granules.

8. A method of preparing alumina of relatively high surface area which comprises reacting dry sodium aluminate particles with anhydrous hydrogen chloride, continuing the reaction until there is no further evidence of heat evolution, then water washing the treated particles to remove sodium chloride formed during the reaction, then drying and calcining the dried residue for a sufficient time to produce alumina particles.

9. A method of preparing alumina of relatively high surface area which comprises reacting dry sodium aluminate particles with anhydrous chlorine, continuing the reaction until there is no further evidence of heat evolution, then water washing the treated particles to remove sodium chloride formed during the reaction, then drying and calcining the dried residue for a sufficient time to produce alumina particles.

10. A method of preparing alumina of relatively high surface area which comprises reacting dry sodium aluminate particles with anhydrous carbon dioxide gas, continuing the reaction until there is no further evidence of heat evolution, then water washing the treated particles to remove water soluble compounds formed during the reaction, then drying and calcining the dried residue for a sufficient time to produce alumina particles.

11. A method of preparing alumina of relatively high surface area which comprises reacting dry sodium aluminate particles with anhydrous hydrogen sulfide gas, continuing the reaction until there is no further evidence of heat evolution, then water washing the treated particles to remove water soluble compounds formed during the reaction, then driving and calcining the dried residue for a sufficient time to produce alumina particles.

References Cited in the file of this patent

UNITED STATES PATENTS

| | | |
|---|---|---|
| 1,797,655 | Haglund | Mar. 24, 1931 |
| 2,247,624 | Wall | July 1, 1941 |
| 2,636,865 | Kimberlin | Apr. 28, 1953 |
| 2,657,115 | Ashley | Oct. 27, 1953 |
| 2,750,258 | Jukkola et al. | June 12, 1956 |